March 15, 1938. McLAREN C. CHILD 2,111,311
ELECTRIC SWITCH
Filed April 7, 1937
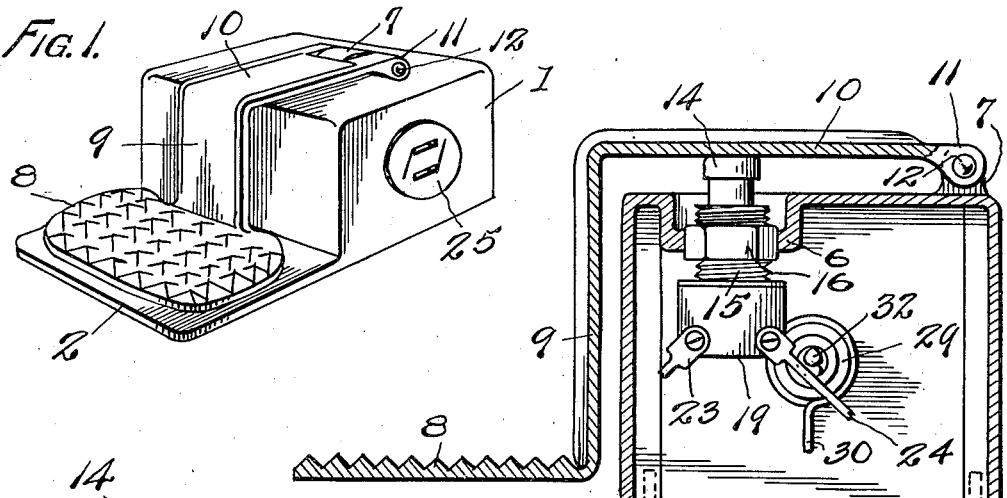
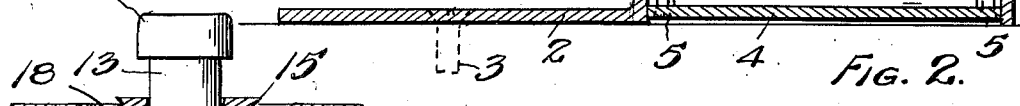
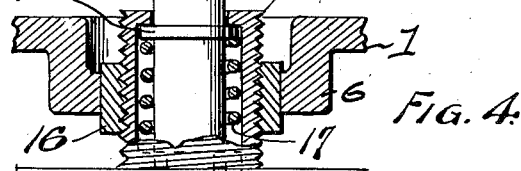
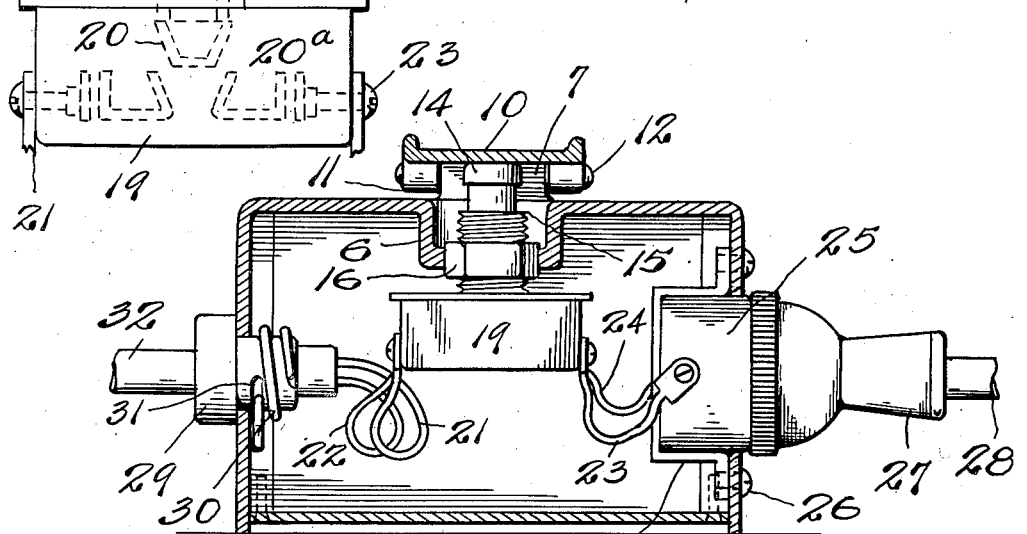
Inventor
M. C. CHILD
By Chas K. Davies & Son
Attorney Patented Mar. 15, 1938

2,111,311

UNITED STATES PATENT OFFICE 2,111,311

ELECTRIC SWITCH

McLaren C. Child, Richmond, Calif.

Application April 7, 1937, Serial No. 135,601

1 Claim. (Cl. 200—153)

The present invention relates to an improved electric switch of the pedal controlled type, and portable, and which is especially designed for use where both a positive and an automatic movement for control of an electric heat, light, and power, device or appliance is essential, and the free use of both hands of an attendant is necessary. Thus, for instance, the switch may be employed to control a light in a photograph enlarging machine, or in an X-ray machine; to control electrically heated appliances; and for control of electric power-tools, machinery, and motors, where freedom of both hands are required to manipulate the work, or a tool, and to maintain positive control of an appliance.

The invention consists in certain novel combinations and arrangements of parts as will hereinafter be more fully set forth and claimed. In the accompanying drawing I have illustrated one complete example of the physical embodiment of my invention wherein the parts are combined and arranged according to one mode I have thus far devised for the practical application of the principles of my invention, but it will be understood that changes and alterations may be made in these exemplifying structures, within the scope of my claim, without departing from the principles of my invention.

While I have shown a single pole double throw type of switch wherein the circuit is closed by movement of the foot-pedal, and the circuit is automatically opened when pressure is removed from the foot-pedal, it will be understood that other types of switches, and other arrangements may be made in the construction and operation of the control switch in its adaptation to various devices and appliances.

Figure 1 is a perspective view of a control switch embodying my invention, and omitting connections thereto and therefrom.

Figure 2 is an enlarged transverse sectional view through the device.

Figure 3 is a longitudinal vertical sectional view, at right angles to the view in Figure 2, showing the cord connections to and from the switch housing and switch box.

Figure 4 is a further enlarged detail view partly in section showing the circuit maker of the switch.

In carrying out my invention I utilize a housing 1 which may be fashioned of cast aluminum or iron, or pressed or stamped from metal, metal alloys or Bakelite, or fashioned in other suitable manner. The housing is preferably of rectangular shape and formed with an integral floor plate 2 that is flush with the edges of the open bottom of the housing, thus adapting the device to rest firmly on a floor or ground-support, and in some instances the otherwise portable device may be secured to a floor or support by means of screws, as 3, shown in dotted lines Figure 2 as passing through holes provided therefore in the base plate.

The open bottom of the housing is closed by a removable bottom plate or board as 4, which is used as a dust guard and insulator for the interior parts of the housing, and the guard or housing-bottom is fastened by screws 5 to posts in the interior corners of the housing.

In the top wall of the housing near its front-center an integral countersunk boss 6 is provided, and at the rear of the housing, on its top face, an integral bearing boss 7 is fashioned, in line with the countersunk boss 6, and perforated for use as a hinge-joint.

The control device for the electric switch comprises a pedal lever having an integral pedal 8, an upright arm 9, an angular arm 10, and a bifurcated end forming bearing lugs 11 that are perforated for complementary use with the bearing boss or lug 7. The pedal, as shown is located in a plane parallel with and just above the base plate 2, and is fashioned with a roughened upper face to facilitate frictional engagement with the shoe-sole of the attendant; the upright arm 9 stands in front of the housing; and the horizontal arm 10 is spaced above and extends rearwardly across the top of the housing. A hinge pin or pivot pin 12 is passed through the complementary lugs 7 and 11, so that the pedal lever may be pressed downwardly, or depressed, or the pedal lever may be lifted and thrown back, or partially thrown back out of operative position, if necessary.

The pedal lever is held in its initial position of Figure 2 by means of a spring pressed, or resiliently supported plunger pin 13, having a bearing head 14 located beneath the arm 10 of the pedal.

The pedal lever, as a whole, is thus suspended from the top rear portion of the housing, and it overhangs the housing, the pin 13, and the base plate. The weight of the overhanging pedal lever holds it in position for use, after the plunger 13 has been properly adjusted, and the pedal 8 lies in a plane closer to the base plate 2 than is the arm 10 to the top of the housing, and therefore the depression of the pedal lever is stopped by its contact with the base-plate. The foot of the operator may thus feel for and readily find the pedal, and when the latter is depressed on the base-plate, the base plate with the pedal thereon forms a solid support for the foot.

The pin forms a depressible plunger that is mounted in an externally threaded bushing 15 upon which bushing is threaded a nut 16, and the latter is fixed in suitable manner in the open bottom of the countersunk boss 6 of the housing. A spring 17 is enclosed within the bushing, coiled about the pin 13, and interposed between a fixed collar 18 on the pin and a bottom portion of the bushing, or the pin and spring may be mounted in the bushing in any other suitable manner to provide the necessary resilient support for the pin. The bushing is readily adjustable in the fixed nut to bring the pin-head 14 in frictional contact with the under face of the lever arm 10 to hold said arm and the pedal-lever in the initial position of Figure 2, and the downward movement of the pin, under depression of the pedal lever, is limited by contact of the shoulder of the head 14 against the top of the bushing.

Thus, as indicated in the drawing, the pin 13 is positively depressed by movement of the pedal, to positively close a circuit maker, and the spring, when the pedal is released, automatically opens the circuit maker.

On the lower end of the bushing 15 a switch box 19 of suitable type is fixed and supported, and the lower end of the pin 13 which projects into the box, is fashioned with a contact member as 20, which, when the pin is depressed, makes electrical and frictional contact with a pair of spaced contact members 20a to close the electric circuit in which the switch is located.

The box 19 is disposed longitudinally within the housing and it has connections 21, 22, 23, and 24, arranged in pairs at its opposite ends, and two of these connections 23 and 24 are extended to an outlet socket-head 25 secured in an opening in one of the side walls of the housing by means of a retaining yoke 25a and screws 26, the latter accessible from the exterior of the housing.

A standard type of connection 27 is shown "plugged in" to the socket-head, and the electric wires which are encased in the usual cord or cable 28 extend to a light, heat, or power appliance utilizing the electric circuit for its energy.

In the opposite side wall of the housing an inlet head 29 is mounted, and fitted in a suitable manner in an opening, and the head is fastened against displacement by means of a spring-lock 30 within the housing, said spring lock being in the form of a spiral, which engages complementary exterior grooves of the head, as indicated at 31 in Figure 3.

The two inlet wires 21 and 22 connected to the switch-box pass through this head 29 merging in the cord or cable 32, and this cord or cable, at its free end, is equipped with a plug similar to plug 27 for connecting the switch with a source of electric supply.

Thus, with the switch in "off" position, as indicated in the drawing, by foot-pressure applied to the pedal, the circuit maker is closed by a positive movement of the switch pin, and if for any reason the foot-pressure is released from the pedal, the spring 17 automatically lifts the pin and pedal, and thereby automatically opens the switch, or circuit maker.

As thus described and illustrated it will be apparent that the switch device is rugged and durable in construction, simple in construction and operation, and reliable and quick-responsive in its operation for positively making and automatically breaking the electric circuit for the electric appliance employing the energies of the circuit.

Having thus fully described my invention, what I claim as new and desire to secure by Letters Patent is:—

The combination with a substantially rectangular housing having a flat top-wall and an extended bottom-base-plate, a resiliently supported switch-member mounted in the top-wall, and an exterior hinge-member at the rear of the top-wall, of an angular lever having a hinge member and a hinge-pin in said hinge-member, one arm of said lever being supported on the switch-member in position substantially parallel with the top-wall, and a pedal integral with the other arm of the angular lever and located in a plane slightly above and substantially parallel with the extended bottom-base-plate.

McLAREN C. CHILD.